UNITED STATES PATENT OFFICE.

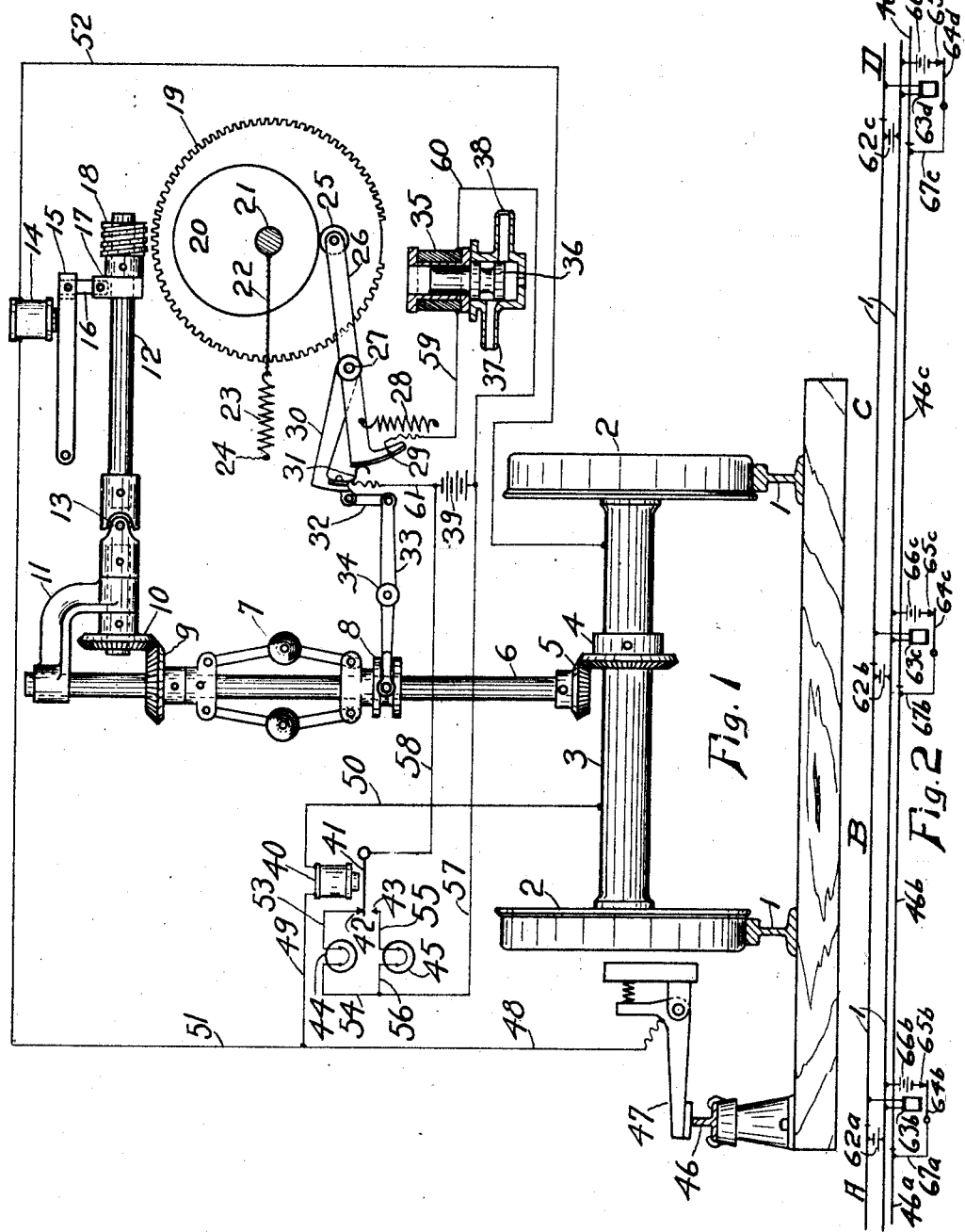

PAUL J. SIMMEN, OF BUFFALO, NEW YORK.

SPEED-CONTROL SYSTEM.

1,315,345. Specification of Letters Patent. Patented Sept. 9, 1919.

Application filed September 10, 1917. Serial No. 190,481.

*To all whom it may concern:*

Be it known that I, PAUL J. SIMMEN, a citizen of the United States, residing at Buffalo, in the county of Erie and State of New York, have invented certain new and useful Improvements in Speed - Control Systems, of which the following is a specification.

This invention relates to a speed control system for railways.

The object of this invention is to provide an improved speed control system for controlling the speed of vehicles moving along a trackway. When a vehicle, equipped with this speed control system is moving along a trackway which is in safe condition for the vehicle to proceed, the speed of the vehicle will only be limited to a predetermined maximum speed. When, however, the trackway ahead of the vehicle is in unsafe condition, a progressively decreasing speed limit is imposed on the vehicle by a device driven from the wheels of the vehicle, in such a manner that the speed reduction curve imposed corresponds to the braking curve which would normally be performed by the vehicle in making a stop. It is an object of this invention to operate such a speed control system by means of a continuous third rail or other conductor adjacent to the track rails.

Other objects and advantages will appear as the description of the invention progresses, and the novel features will be particularly pointed out in the appending claims.

In describing the invention in detail, reference is had to the accompanying drawings, wherein I have illustrated a preferred physical embodiment of my invention, and wherein like characters of reference designate corresponding parts throughout the several views, and in which—

Figure 1 is a diagrammatic view of the vehicle carried devices, and Fig. 2 is a diagrammatic view of the devices along the trackway for operating such vehicle carried devices.

Referring to Fig. 1, 1, 1 are the track rails upon which the vehicle is adapted to travel; 2, 2 are its wheels and 3 is its axle. Rigidly mounted on the axle 3 is a bevel gear 4, which meshes with a corresponding bevel gear 5 which is rigidly mounted upon a vertical shaft 6. The vertical shaft 6 is suitably supported at a convenient place on the vehicle by a bearing contained in the bracket 11. Mounted upon the vertical shaft 6 is a centrifugal governor 7, whose upper collar is rigidly attached to the shaft 6, and whose lower collar 8 is slidable upon shaft 6, said lower collar 8 being provided with an annular groove. Rigidly attached to the upper end of the shaft 6 is a bevel gear 9, which meshes with a bevel gear 10, which is rigidly attached to the shaft 12. The shaft 12 is provided with a universal joint 13, the said shaft 12 being suitably supported at one end in a bearing included in the bracket 11, and at the other end in a bearing 17. At the other end of the shaft 12 is a worm 18, which is adapted under certain circumstances to mesh with a worm wheel 19 rigidly mounted on the shaft 21. The bearing 17 which supports the right hand end of the shaft 12 is attached by a link 16 to the armature 15 of the electromagnet 14. When the electromagnet 14 is energized, its armature 15 is attracted and the worm 18 is held out of mesh with worm wheel 19, but when the electromagnet 14 is deënergized, its armature 15 assumes its lower position and the worm 18 drops into mesh with the worm wheel 19.

Also rigidly mounted on the shaft 21 is a cam 20. Bearing against the surface of the cam 20 is a roller 25, which is rotatably mounted on one end of lever 26, which is pivotally mounted at the point 27. The contact between the roller 25 and the cam 20 is promoted by a tension spring 28. Attached to the shaft 21 is a cord 22, whose other end is attached to one end of a tension spring 23, the other end of the said tension spring 23 being rigidly attached to a convenient part of the vehicle at 24. The worm wheel 19 is provided with a mutilated portion so that after a certain amount of rotation caused by the worm 18, no further rotation of the worm wheel 19 will take place, despite the fact that the worm 18 may still be in its lower position and still rotating.

The left hand end of the lever 26 is in the form of an electrical contact 29, which is adapted under certain circumstances to contact with a contact spring 31. The contact spring 31 is rigidly mounted on the arm 30 and insulated therefrom. The arm 30 has one end pivotally attached to a convenient part of the vehicle at 27. The other end of the arm 30 is attached by a link 32 with one end of a lever 33, which is pivotally attached near its middle point to a convenient part of the vehicle at 34. The other end of the lever 33 consists of a fork member, whose ends rest in the annular groove in the lower collar 8 of the governor 7.

There is also provided on the vehicle a relay 40, having an armature 41, which is adapted when the relay is energized to touch the front contact 42; when the relay 40 is deenergized the armature 41 touches the back contact 43. In the train line air pipe, there is provided a valve 36, which is operated by an electromagnet 35. When the electromagnet 35 is energized the valve 36 is in its upper position and pressure from the train line air pipe 37 is communicated to the annular chamber surrounding the valve 36, thus maintaining the valve 36 in a balanced condition as far as air pressure is concerned. When the electromagnet 35 is deënergized, the valve 36 drops into its lower position and the air from the train line air pipe 37 is communicated by means of the annular chamber surrounding the valve piston 36 to the atmosphere by means of the pipe 38.

Mounted at a convenient place on the vehicle is a contact shoe 47, which is adapted to contact with a third rail or conductor 46. There are also provided on the vehicle, a battery or other source of energy 39, a clear signal lamp 44, and a danger signal lamp 45. The parts heretofore described are suitably connected by electric wires or conductors, which will be more fully described in the description of circuits hereinafter set forth.

In Fig. 2 there is shown a trackway divided into blocks, complete blocks B and C being shown, and parts of blocks A and D being shown. These blocks are obtained by suitable insulating joints placed in one of the track rails, the other track rail being electrically continuous. As the blocks are identical, I will merely describe the devices related to block C. At one end of the block is a track battery $62^c$, which is connected to the track rails. Connected to the other end of the track rails is a relay $63^c$, having an armature $64^c$, which is adapted, when the relay is energized to touch the front contact $65^c$. There is also provided a battery $66^c$, one terminal of which is connected to the continuous track rail, the other terminal being connected to the front contact $65^c$. The armature $64^c$ is connected by wire $67^b$ with the continuous third rail section $46^b$. It will be noted that the continuous third rail or conductor 46 is divided into sections corresponding to the blocks A, B, C and D, the sections being marked $46^a$, $46^b$, $46^c$ and $46^d$ respectively.

The operation of this device is as follows: When a block is clear, its corresponding track relay, such as $63^c$ will be energized by its track battery $62^c$. This will result in the continuous rail section $46^b$ being connected to one terminal of the battery $66^c$ by means of a wire $67^b$, the armature $64^c$ and the front contact $65^c$. Assuming that under such conditions a vehicle is traveling in the block B with its shoe 47 in contact with the third rail section $46^b$, current will flow through the following circuit: from one terminal of the battery $66^c$ to front contact $65^c$, armature $64^c$, wire $67^b$, third rail $46^b$, shoe 47, wires 48 and 49, relay 40, wire 50, axle 3, wheels 2, track rail to the other side of the battery $66^c$. Current will also flow through the following multiple circuit: from the third rail section $46^b$ to the shoe 47, wires 48 and 51, electromagnet 14, wire 52, to the axle 3 of the vehicle; thus both the relay 40 and the electromagnet 14 will be energized. When the relay 40 is energized the clear signal lamp 44 burns through the following circuit: from the positive side of the battery 39 to the wire 58, armature 41, front contact 42, wire 53, clear signal lamp 44, wires 54 and 57 to the negative side of the battery 39. The result of the energizing of electromagnet 14 is that the worm 18 is held out of mesh with the worm wheel 19, and the spring 23 holds the cam 20 in its maximum speed position as shown in Fig. 1. It will be observed that as the speed of the vehicle increases, the collar 8 of the governor 7 will be moved upward, resulting in a downward movement of the contact spring 31. As long as the vehicle does not exceed the predetermined maximum speed, the contact spring 31 will be making contact with the contact 29. This results in energizing the electromagnet 35 through the following circuit: from the positive side of the battery 39 to the wire 61, contact spring 31, contact 29, wire 59, electromagnet 35, wire 60 to the negative side of the battery 39. Therefore, as long as the contact spring 31 is touching the contact 29, the brakes will not be automatically applied. However, should the speed of the vehicle exceed the predetermined maximum speed, the contact spring 31 will be moved down until it no longer contacts with the contact 29, and the circuit heretofore described for the electromagnet 35 will be broken and the brakes will be automatically applied until the speed of the train is reduced to its predetermined maximum speed, at which time the contact spring 31 will again make contact with the contact 29 and the brakes will be released.

Assuming that the block C is occupied by a train, the track battery $62^c$ will be short circuited by the wheels of the train, and the relay $63^c$ will become deënergized, causing its armature $64^c$ to drop away from the front contact $65^c$ and open the connection between the battery $66^c$ and the third rail section $46^b$, thus leaving this third rail section deënergized. If now a vehicle is moved in the block B with its shoe 47 on the third rail section 46ᵇ, no current will flow from this third rail section through the shoe and the circuits previously described. Therefore, the relay 40 will become deënergized and the electro-magnet 14 will also become deënergized. When the relay 40 is deënergized, the danger signal lamp 45 will burn through the following circuit: from the positive side of the battery 39 to the wire 58, armature 41, back contact 43, wire 55, danger signal 45, wires 56 and 57 to the negative side of the battery 39. The fact that the electro-magnet 14 is deënergized results in the worm 18 dropping into mesh with the worm wheel 19, and further movement of the vehicle will then cause the worm wheel 19 and the cam 20 to be rotated in a direction corresponding to the direction of movement of the vehicle. As the cam 20 rotates, the roller 25 is caused to move downward, thereby raising the contact 29. This rotation of the cam 20 continues until the worm 18 reaches the mutilated portion of the worm wheel 19, when the cam 20 moves no farther. In this position, the roller 25 will have been moved so low that the contact 29 will be in such a position with respect to the contact spring 31, that any slight movement of the vehicle will cause the contact spring 31 to break contact with the contact 29, thus applying the air brakes. The cam 20 is so designed that in moving from its maximum speed position to the stop position, a permissible speed curve is generated which corresponds to an ordinary service braking of the vehicle. It will be obvious that at any time while the cam is moving from its maximum speed position to the stop position the speed of the vehicle will be limited by the position of the contact 29 as determined by the eccentricity of the cam.

Instead of designing the cam so that its minimum position results in stopping the vehicle, the cam may be so designed that the vehicle is permitted to proceed at a predetermined minimum speed, as for example—five miles an hour.

When the third rail section with which the shoe 47 is contacting again becomes energized or when the shoe 47 passes onto another third rail section which is energized, the relay 40 again becomes energized, the clear signal lamp 44 again burns, the electromagnet 14 again becomes energized raising the worm 18 out of mesh with the worm wheel 19, and permitting the spring 23 to return the cam 20 to its maximum speed position. When this occurs the train may again proceed at any speed under the predetermined maximum speed, without an automatic application of the brakes taking place.

The advantages of my invention will be obvious to those skilled in the art. Among these advantages I wish to mention that this device enforces observance of signals, but applies the brakes automatically only in accordance with the speed of the train. Also, when the train in the block ahead has left that block, the immediate resultant energizing of the third rail section in the block in which the following train is traveling, immediately restores the speed control apparatus on that vehicle to the maximum position so that the train may resume maximum speed at the earliest possible moment.

Although I have particularly described the construction of one physical embodiment of my invention and explained the operation and principle thereof, nevertheless, I desire to have it understood that the form selected is merely illustrative, but does not exhaust the possible physical embodiments of means underlying my invention.

What I claim as new and desire to secure by Letters Patent of the United States, is:

1. In a speed control system for railway vehicles, a track, a vehicle thereon, a permissible speed device on the vehicle having a maximum speed position and a minimum speed position and means including continuous devices along the trackway for normally holding said permissible speed device in its maximum speed position.

2. In a speed control system for railway vehicles, a track, a vehicle thereon, an actual speed device on the vehicle, a permissible speed device on the vehicle having a maximum speed position and a minimum speed position, means including continuous devices along the trackway for normally holding said permissible speed device in its maximum speed position, means for retarding the vehicle and means for actuating the retarding means when the actual speed of the vehicle exceeds a predetermined maximum speed.

3. In a speed control system for railway vehicles, a track, a vehicle thereon, a permissible speed device on the vehicle having a maximum speed position and a minimum speed position, means including continuous devices along the trackway for normally holding said permissible speed device in its maximum speed position and means on the vehicle for moving said permissible speed device from its maximum speed position to its minimum speed position in accordance with the distance traveled by the vehicle.

4. In a speed control system for railway vehicles, a track, a vehicle thereon, an actual speed device on the vehicle, a permissible speed device on the vehicle having a maximum speed position and a minimum speed position, means including continuous devices along the trackway for normally holding said permissible speed device in its maximum speed position, means on the vehicle for moving said permissible speed device from its maximum speed position to its minimum speed position in accordance with the distance traveled by the vehicle, means for retarding the vehicle, and means for actuating the retarding means when the actual speed of the vehicle exceeds the permissible speed corresponding to the position of the permissible speed device.

5. In a speed control system for railway vehicles, a track, a vehicle thereon, a permissible speed device on the vehicle having a maximum speed position and a minimum speed position, means including continuous devices along the trackway for normally holding said permissible speed device in its maximum speed position, means on the vehicle for moving said permissible speed device from its maximum speed position to its minimum speed position in accordance with the distance traveled by the vehicle, when danger conditions exist and means on the vehicle for maintaining said permissible speed device in its minimum position as long as danger conditions persist.

6. In a speed control system for railway vehicles, a track, a vehicle thereon, an actual speed device on the vehicle, a permissible speed device on the vehicle having a maximum speed position and a minimum speed position, means including continuous devices along the trackway for normally holding said permissible speed device in its maximum speed position, means on the vehicle for moving said permissible speed device from its maximum speed position to its minimum speed position in accordance with the distance traveled by the vehicle, when danger conditions exist, means on the vehicle for maintaining said permissible speed device in its minimum position as long as danger conditions persist, means for retarding the vehicle, and means for actuating the retarding means when the actual speed of the vehicle exceeds the permissible speed corresponding to the position of the permissible speed device.

7. In a speed control system for railway vehicles, a track, a vehicle thereon, a permissible speed device on the vehicle having a maximum speed position and a minimum speed position, means including continuous devices along the trackway for normally holding said permissible speed device in its maximum speed position, means on the vehicle for moving said permissible speed device from its maximum speed position to its minimum speed position in accordance with the distance traveled by the vehicle, when danger conditions exist, means on the vehicle for maintaining said permissible speed device in its minimum speed position as long as danger conditions persist, and means including the said continuous devices along the trackway for automatically restoring said permissible speed device to its maximum speed position when danger conditions no longer exist.

8. In a speed control system for railway vehicles, a track, a vehicle thereon, an actual speed device on the vehicle, a permissible speed device on the vehicle having a maximum speed position and a minimum speed position, means including continuous devices along the trackway for normally holding said permissible speed device in its maximum speed position, means on the vehicle for moving said permissible speed device from its maximum speed position to its minimum speed position in accordance with the distance traveled by the vehicle when danger conditions exist, means on the vehicle for maintaining said permissible speed device in its minimum speed position as long as danger conditions persist, means including the said continuous devices along the trackway for automatically restoring said permissible speed device to its maximum speed position when danger conditions no longer exist, means for retarding the vehicle, and means for actuating the retarding means when the actual speed of the vehicle exceeds the permissible speed corresponding to the position of the permissible speed device.

9. In a speed control system for railway vehicles, a track, a vehicle thereon, a permissible speed device on the vehicle having a maximum speed position and a minimum speed position, means for normally holding the said permissible speed device in its maximum speed position, means for moving the said permissible speed device from its maximum speed position toward its minimum speed position, and means including continuous devices along the trackway for restoring the said permissible speed device to its maximum speed position.

10. In a speed control system for railway vehicles, a track, a vehicle thereon, an actual speed device on the vehicle, a permissible speed device on the vehicle having a maximum speed position and a minimum speed position, means for normally holding the said permissible speed device in its maximum speed position, means for moving the said permissible speed device from its maximum speed position toward its minimum speed position, means including continuous devices along the trackway for restoring the said permissible speed device to its maximum speed position, means for retarding the vehicle, and means for actuating the retarding means when the actual speed of the vehicle exceeds the permissible speed corresponding to the position of the permissible speed device.

PAUL J. SIMMEN.

Copies of this patent may be obtained for five cents each, by addressing the "Commissioner of Patents. Washington, D. C."